Dec. 28, 1948.　　　D. F. FASOLDT　　　2,457,540
DEVICE FOR SLITTING THE SHEATH OF A CABLE
Original Filed June 10, 1940　　　2 Sheets-Sheet 1
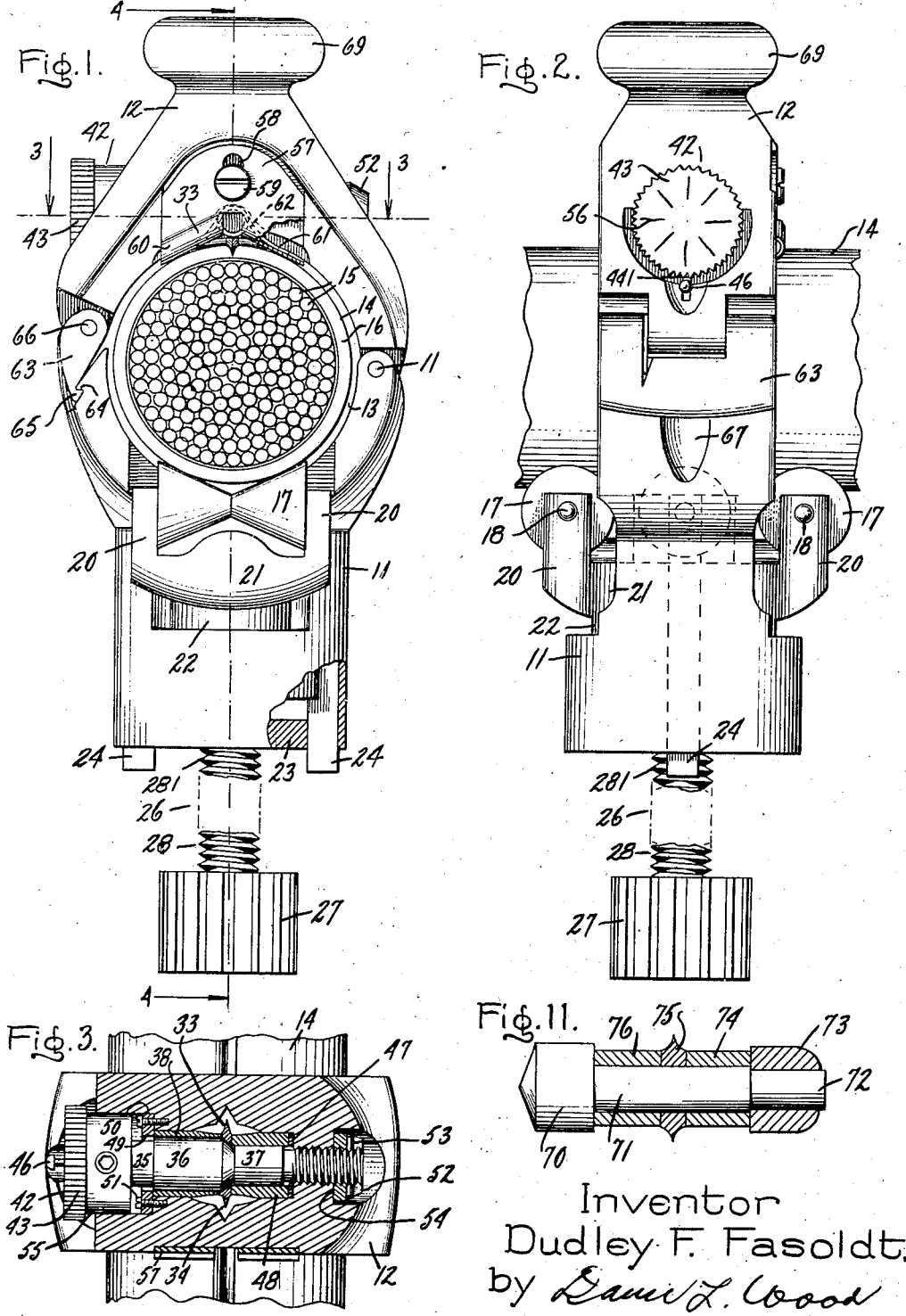
Inventor
Dudley F. Fasoldt,
by　　His Attorney.

Dec. 28, 1948. D. F. FASOLDT 2,457,540
DEVICE FOR SLITTING THE SHEATH OF A CABLE
Original Filed June 10, 1940 2 Sheets-Sheet 2
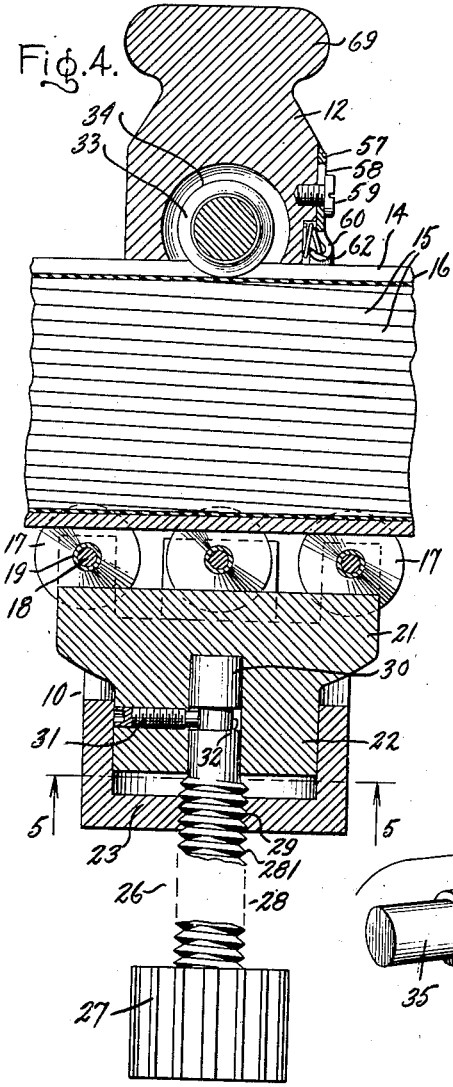
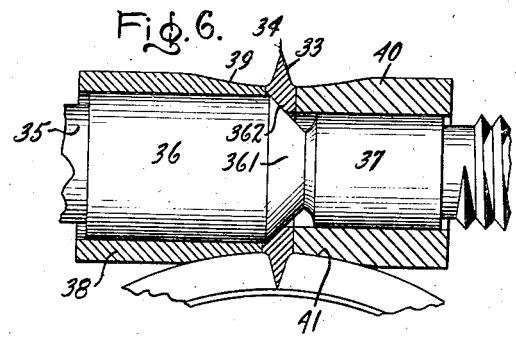
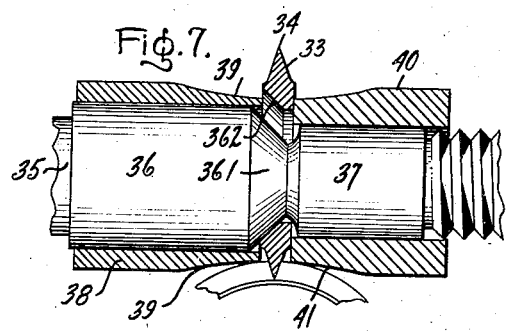
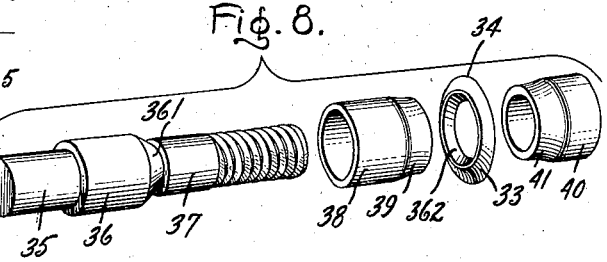
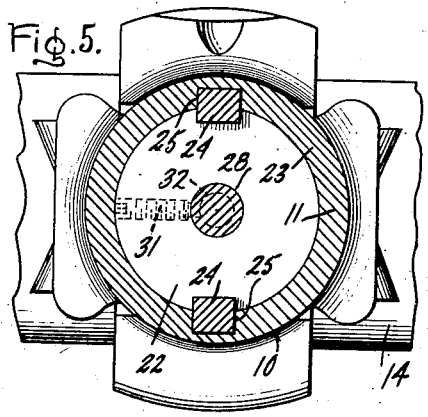
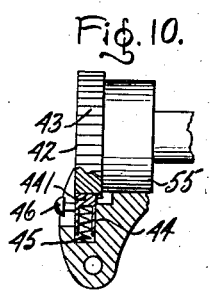
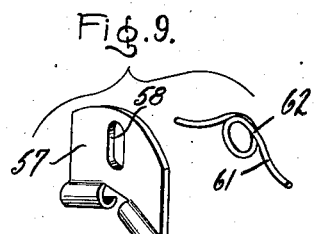
Inventor
Dudley F. Fasoldt
by His Attorney.

Patented Dec. 28, 1948

2,457,540

UNITED STATES PATENT OFFICE 2,457,540

DEVICE FOR SLITTING THE SHEATH OF A CABLE

Dudley Farlin Fasoldt, Prospect Heights, Rensselaer, N. Y.

Substituted for abandoned application Serial No. 339,600, June 10, 1940. This application January 18, 1947, Serial No. 722,925

5 Claims. (Cl. 30—91)

My invention more particularly relates to a device for slitting the sheath of a cable comprising an outer sheath of lead or other suitable soft material in which is enclosed a multiplicity of wires which are commonly covered with paper or other insulating material. Such cables are usually carried on supports where they are exposed. The sheaths of such cables are occasionally punctured, as, for example, by a misdirected shot from an air rifle or from other causes. Moisture then finds its way into the sheath and short circuits the wires within. It then becomes necessary to open the sheath, withdraw the wires therefrom, rewind at least a portion of the wires, replace the same in the sheath and then repair the sheath to make it again fluid tight.

When a sheath has thus been punctured, it has been the common practice for a repair man to place a rather clumsy V-shaped tool carrying a cutting element above the cable and reciprocate the tool in engagement with the sheath until the cutting element has cut a groove in the sheath by gradual removal of the material therefrom. He then opens the sheath, withdraws the wires, rewinds the same where necessary and then replaces the wires in the sheath and closes the same. Such an operation is slow and fatiguing to the operator and necessarily requires a considerable amount of time and is, therefore, expensive. Furthermore, a skilled operator is required for carrying out the operation and even then the cutting element is liable, when it is passed through the sheath, to cut the wires as there are no means for determining when the cutting element has just passed through the cable.

In accordance with my invention, a cutting tool and associated means are provided for slitting the cable to a predetermined depth below the surface thereof.

In accordance with my invention, also, a head is provided with an opening in which a cable is receivable and which is mounted on a movable support.

Another object of my invention is the provision of a head of the foregoing character which comprises a cap pivotally mounted on said head and forming therewith an opening in which the sheathed cable is receivable.

A further object of my invention is the provision of a cutting element mounted in the said cap and which is initially above the position occupied by the cable so that when the cable is raised, it is brought into contact with the cutting element.

A further specific object of my invention is the provision of a rotatable cutting element which is rotated by the movement of the head along the cable.

A further object of my invention is the provision of means for adjusting the position of the cutting element relatively to the cable.

A still further object of my invention is a slitting tool of the foregoing character which may be operated by an unskilled operator.

Other objects of my invention will appear in the specification and the novel features thereof will be pointed out in the claims.

My invention will best be understood by reference to the accompanying drawings in which Fig. 1 is a side elevation of the device embodying my invention;

Fig. 2 is a front elevation of the device illustrated in Fig. 1;

Fig. 3 is a section taken along the line 3—3 of Fig. 1;

Fig. 4 is a vertical section taken along the line 4—4 in Fig. 1;

Fig. 5 is an inverted sectional plan view taken along the line 5—5 in Fig. 4;

Fig. 6 is a fragmentary longitudinal sectional view illustrating the shaft and sleeves mounted thereon for adjusting the height of the slitting tool relatively to the cable;

Fig. 7 is a view similar to Fig. 6 but illustrating the slitting tool in a position different from that shown in Fig. 6;

Fig. 8 is an exploded perspective view illustrating the parts shown in Figs. 6 and 7 on a smaller scale;

Fig. 9 is a perspecive view of a shield and an associated spring;

Fig. 10 is a fragmentary view, partly in section and partly in elevation, illustrating a device for retaining the head of the operating shaft for the cutting tool in a predetermined position, and Fig. 11 is a view similar to Fig. 6 illustrating a modification.

Like reference characters indicate like parts throughout the drawing.

Referring to the drawings, 10 is a head to which is pivotally connected as at 11 a cap 12 (Fig. 1), the head and the cap, which may together be considered as the head, forming an opening 13 in which a cable 14 is receivable. The cable, which is principally used in telephone and telegraph service, comprises a multiplicity of conductors 15 which are individually covered with paper or other insulating material in a manner well known and not illustrated herein, the conductors being enclosed in a sheath 16 formed of soft material, usually lead which may readily be cut.

In the embodiment of my invention illustrated, the cable is supported on conical rollers 17, three such rollers being illustrated, the rollers being mounted on suitable shafts 18 preferably surrounded by bearing sleeves 19 as illustrated in Fig. 4. The sleeves and shafts are in turn supported on brackets 20 on a vertically movable member 21 the lower portion 22 of which is preferably cylindrical in form and received in a cup shaped element 23.

By turning the head 27 and the shaft 28 on which it is mounted it is obvious that the shaft, due to its threaded engagement with the threaded opening 29, raises and lowers the movable member 21 and the cable which is mounted thereon.

An annular floating cutting roller 33 provided with a conical opening therein is provided with a cutting edge 34 and is mounted on a shaft 35 extending above and transversely of the cable as best indicated in Figs. 4, 6 and 7. The shaft is provided with two adjacent enlargements 36 and 37 (Fig. 6), the enlargements 36 being provided with a conical surface 361 which faces the enlargement 37, the cutting tool 33 being disposed between the facing ends of the two enlargements 36 and 37. The conical surface 361 cooperates with a conical surface 362 with which the inner wall of the cutting tool 33 is provided. The enlargement 36 is surrounded by a rotatable sleeve 38 provided with a curved surface 39 having the same radius of curvature as that of the cable while the enlargement 37 is surrounded by a rotatable sleeve 40 which is also provided with a curved surface 41 likewise having the same radius of curvature as that of the cable.

To one end of the shaft 35 is attached an operating head 42 secured to the shaft and comprising a toothed indicating member 43 which is retained in a desired position by means of a detent 44 (Fig. 10) which is pressed upwardly by a spring 45, and is provided with a tooth 441 (Fig. 2) which engages any desired recess in the toothed member 43. The detent may be depressed against the action of the spring 45 by a pin 46. A bearing washer 47 (Fig. 3) is preferably positioned in the bottom of a recess 48 formed in the cap 12 of the head. The sleeves are retained in position by a ring 49 (Fig. 3) which engages a shoulder 50 formed in said cap by means of screws 51 as best indicated in Fig. 3. A nut 52 is threaded on the threaded end of the shaft 35 as best indicated in Fig. 3 and may conveniently be retained in position thereon by means of a transverse pin 53 passing through a nut 52 which engages a shoulder 54 in the head and the sleeve 55 with which the detent member 43 is integral. The longitudinal movement of the shaft may readily be confined to an amount somewhat less than what corresponds to a single turn of the shaft thereby preventing possible confusion in reading the indicator 56 (Fig. 2). Means are thus provided for moving the cutting tool away from the axis of the shaft, the extent of such movement and consequently the depth of the scarf in the sheath depending upon the extent of the longitudinal movement of said shaft. The extent of movement of the shaft is indicated on the dial.

A shield 57 secured to the head 10 preferably projects partially across the opening 13 formed between the head 10 and the cap 12 in order to prevent the insertion of the cable into the opening from breaking the edge of the cutting tool.

Shield 57 is provided with a suitable slot 58 through which passes a screw 59. The lower edge of the shield 57 is preferably turned upwardly as at 60 (Figs. 1 and 9) and a spring 61 is provided with a loop 62 through which the screw 59 passes into the head 10, the end of the spring being received in the upwardly turned portion 60 of the shield and normally retaining the shield in its lowered position across the opening 13. Obviously, a similar shield may, if desired, be secured to the opposite side of the cap 12.

In order to insert the cable, therefore, it is necessary that the operator first raise the shield 57 from its position across the opening in order to insert the cable thus reminding the operator that care is to be exercised in inserting the cable into the opening 13 in the cutting tool.

The cap 12 may conveniently be secured in position against the head by means of a latch 63 (Fig. 1) formed with a detent 64 which normally engages a tooth 65 formed in the head. The latch 63 is pivoted as at 66 and is normally retained in the position indicated in Fig. 1 by means of a suitable spring. In order to raise the cap, the operator lifts the latch 63, a suitable finger guide 67 (Fig. 2) being provided in the head for the operator's fingers.

It will be understood that tables are provided for the operator which show the number of conductors in a given cable and which correspond to a given thickness of sheath.

The operation of the device embodying my invention is as follows. When it becomes necessary to slit the cable because of a short circuit in the conductors within the cable or for any other reason, the operator first determines the thickness of the sheath of the cable from the table above mentioned with which he is provided. He then sets the cutting tool to a position in which the edge of the cutting tool will just penetrate the cable sheath. This is done by rotating the head 27 on the shaft 28 until the indicator 43 on the toothed wheel 42 shows the operating head in correct position. The cap is then closed against the head bringing the annular cutting tool 33 into engagement with the sheath of the cable. When the cutting tool 33 occupies the position indicated in Fig. 7, the cutting tool does not penetrate the sheath of the cable. Now by turning the shaft 35, the beveled face 361 of the enlargement 36 on the shaft engages the beveled face 362 on the inner side of the cutting tool and forces the latter downwardly until the cutting edge of the tool just penetrates the sheath of the cable. The operator then grasps the tool, one hand engaging a suitable hand grasp 69 which is preferably provided on the top of the cap of the device, the other hand engaging the lower end 22 of the head. Then by moving the slitting tool longitudinally of the cable, the sheath of the cable is cut by means of the cutting tool 33, the extent of movement of the device being limited only by the reach of the operator which is ordinarily sufficient. Should it be desired to open the cable a further distance it is only necessary for the operator to change the ladder or other support on which he is standing and continue the movement of the cutting tool.

The cutting tool of the character described, when positioned between the ends of the sleeves or rollers 38 and 40 provided with curved surfaces which fit the sheath of the cable, produces a cut free from burs or rough edges of any character, the sleeves which hug the revolving cutting roller serving to remove any roughness along the edges of the slit, a feature not present, so far as I am aware, is known cutting tools.

In the embodiment of my invention illustrated in Fig. 11, the cutting roller 75 is not floating as is the cutting roller 33 previously described. In the arrangement here shown, the shaft 71 is provided at one end with an integral cylindrical head 70, a sleeve 76 being interposed between the cutting roller 75 and the head. A cylindrical head 73 is also secured to the opposite contracted end 72 of the shaft and may conveniently be secured thereon and in engagement with the cutting roller 75 be rivetting the end 72 of the shaft. It will be understood that the sleeves 74, 76 and the cutting tool 75 only rotate. While not limited thereto, the device shown in Fig. 11 is particularly intended for use with comparatively small cables.

While I have described my invention in its preferred embodiment, it is to be understood that the words which I have used are words of description rather than of limitation. Hence, changes within the purview of the appended claims may be made without departing from the true scope and spirit of my invention in its broader aspects.

This application is filed in place of my forfeited application Serial No. 339,600, filed June 10, 1940, and allowed November 29, 1941, now abandoned, and is identical with said forfeited application as allowed.

What I claim is:

1. In a cable cutting device, a head provided with an opening in which a cable provided with a sheath is receivable, a shaft mounted in said head above said cable and at substantially right angles thereto, a revoluble cutting tool provided with a hole of greater diameter than that of said shaft and mounted thereon, means for preventing undersirable longitudinal movement of said cutting tool on said shaft, means associated with said shaft and said cutting tool for displacing said cutting tool axially of said shaft whereby the depth of scarf cut by said tool in said sheath may be varied, and means whereby said cutting tool may be moved longitudinally along said cable.

2. In a cable cutting device, a head provided with an opening in which a cable provided with a sheath is receivable, a shaft mounted in said head above said cable and at substantially right angles thereto, said shaft being provided with a conical portion, a substantially circular cutting tool provided with a conical hole larger than the diameter of said shaft, the conical surface of said cutting tool facing the conical portion of said shaft, means for preventing longitudinal movement of said cutting tool on said shaft, and means for moving said shaft longitudinally of said cutting tool and thereby displacing said cutting tool axially from said shaft to bring the same into cutting engagement with the sheath of said cable, and means whereby the longitudinal movement of said shaft may be adjusted thereby adjusting the depth of scarf in the sheath of said cable, and means for moving said cutting tool longitudinally of said cable.

3. In a cable cutting device, a head adapted to be mounted on a sheathed cable, a shaft mounted in said head transversely and laterally of said cable, a substantially circular cutting tool mounted on said shaft and in substantial alignment with said cable, sleeves mounted on said shaft with their inner ends in engagement with opposite sides of said cutting tool, said cutting tool being provided with an opening larger than the portion of the shaft on which it is mounted and formed with a conical surface, a conical surface on said shaft engageable with that of said cutting tool whereby longitudinal movement of said shaft produces radial movement of said cutting tool thereby forcing the same into the sheath of said cable and means whereby said cutting tool may be moved along said cable whereby longitudinal movement of said cutting tool produces a longitudinal cut in said cable.

4. In a cable cutting device, a head adapted to be mounted on a sheathed cable, a shaft mounted in said head transversely and laterally of said cable, a substantially circular cutting tool mounted on said shaft and in substantial alignment with said cable, sleeves mounted on said shaft with their inner ends in engagement with opposite sides of said cutting tool, said cutting tool being provided with an opening larger than the portion of the shaft on which it is mounted and formed with a conical surface, a conical surface on said shaft engageable with that of said cutting tool whereby longitudinal movement of said shaft produces radial movement of said cutting tool thereby forcing the same into the sheath on said cable, and means whereby said cutting tool may be moved longitudinally of said cable whereby longitudinal movement of said cutting tool produces a longitudinal cut in said cable, and means for indicating the depth of cut of said sheath.

5. In a cable cutting device, a head adapted to be mounted on a sheathed cable, a shaft mounted in said head transversly and laterally of said cable, a substantially circular cutting tool mounted on said shaft and in substantial alignment with said cable, sleeves mounted on said shaft with their facing ends in engagement with opposite sides of said cutting tool, said cutting tool being provided with an opening larger than the portion of the shaft on which it is mounted and formed with a conical surface, a conical surface on said shaft engageable with that of said cutting tool whereby longitudinal movement of said shaft provides radial movement of said cutting tool thereby forcing the same into the sheath on said cable, means whereby longitudinal movement of said cutting tool may be provided whereby longitudinal movement of said shaft produces a longitudinal movement of said cutting tool and a longitudinal cut in said cable and means for indicating the longitudinal movement of said shaft and the depth of cut of said sheath.

DUDLEY FARLIN FASOLDT.

No references cited.